(12) United States Patent
Boring et al.

(10) Patent No.: US 10,429,130 B2
(45) Date of Patent: Oct. 1, 2019

(54) REFRACTORY KILN CAR RESISTANT TO HIGH TEMPERATURE SHOCK AND CREEP

(71) Applicant: Magneco/Metrel, Inc., Addison, IL (US)

(72) Inventors: Eric Boring, Hampshire, IL (US); Michael W. Anderson, West Chicago, IL (US); Daniel Snyder, Winfield, IL (US); Lara Binz, Volo, IL (US)

(73) Assignee: Magneco/Metrel, Inc., Addison, IL (US)

( * ) Notice: Subject to any disclaimer, the term of this patent is extended or adjusted under 35 U.S.C. 154(b) by 0 days.

(21) Appl. No.: 15/868,938

(22) Filed: Jan. 11, 2018

(65) Prior Publication Data
US 2018/0266767 A1 Sep. 20, 2018

Related U.S. Application Data

(63) Continuation-in-part of application No. 15/461,322, filed on Mar. 16, 2017, now Pat. No. 9,994,486.

(51) Int. Cl.
*C04B 35/10* (2006.01)
*F27D 3/12* (2006.01)
(Continued)

(52) U.S. Cl.
CPC .............. *F27D 3/123* (2013.01); *C04B 33/22* (2013.01); *C04B 35/1015* (2013.01);
(Continued)

(58) Field of Classification Search
CPC ........ C04B 28/24; C04B 14/041; C04B 14/06; C04B 14/30; C04B 18/146; C04B 35/18;
(Continued)

(56) References Cited

U.S. PATENT DOCUMENTS 3,992,213 A 11/1976 Desouches et al.
4,331,773 A * 5/1982 Hongo ................ C04B 35/6303
501/100

(Continued)

FOREIGN PATENT DOCUMENTS

CA 973 207 A 8/1975
EP 0952 194 A2 10/1999
(Continued)

OTHER PUBLICATIONS

R. Hashemi-Nasab et al., "Effect of Silica Nanoparticles Surface Treatment on In Situ Pollymerization of Sytrene-Butyl Acrylate Latex", Progress in Organic Coatings, 2013, v. 7 pp. 1016-1023.
(Continued)

*Primary Examiner* — Noah S Wiese
(74) *Attorney, Agent, or Firm* — Maxwell J. Petersen; Lewis Brisbois Bisgaard & Smith LLP

(57) ABSTRACT

A refractory kiln car formed using a refractory composition has excellent resistance to high-temperature thermal shock and creep. The refractory composition is based primarily on chamotte having controlled particle sizes, and may also include mullite, fused silica, calcined alumina and microsilica, having controlled particle sizes. The refractory composition includes an aqueous colloidal silica binder that provides excellent castability and binding between the ingredients following drying.

18 Claims, 5 Drawing Sheets

(51) Int. Cl.
*C04B 35/101* (2006.01)
*C04B 35/63* (2006.01)
*C04B 35/66* (2006.01)
*C04B 33/22* (2006.01)

(52) U.S. Cl.
CPC ...... *C04B 35/6303* (2013.01); *C04B 35/6316* (2013.01); *C04B 35/66* (2013.01); *C04B 2235/3206* (2013.01); *C04B 2235/3217* (2013.01); *C04B 2235/3418* (2013.01); *C04B 2235/3463* (2013.01); *C04B 2235/5427* (2013.01); *C04B 2235/5436* (2013.01); *C04B 2235/5445* (2013.01); *C04B 2235/5454* (2013.01); *C04B 2235/5472* (2013.01)

(58) Field of Classification Search
CPC .. C04B 35/6316; F27D 1/0006; F27D 1/1621
See application file for complete search history.

(56) References Cited

U.S. PATENT DOCUMENTS

| | | | |
|---|---|---|---|
| RE31,482 E | 1/1984 | Noble | |
| 5,147,830 A | 9/1992 | Banerjee | |
| 5,422,323 A * | 6/1995 | Banerjee | C04B 35/18 266/280 |
| 5,482,904 A | 1/1996 | Kawabe et al. | |
| 5,494,267 A | 2/1996 | Anderson | |
| 5,505,893 A | 4/1996 | Connors, Jr. | |
| 5,569,320 A * | 10/1996 | Sasaki | B22C 1/205 106/287.16 |
| 5,584,921 A | 12/1996 | Wagner et al. | |
| 5,632,937 A | 5/1997 | Soofi | |
| 5,667,378 A * | 9/1997 | Bushman | B28B 11/243 432/137 |
| 5,938,434 A * | 8/1999 | Groom | F27D 3/123 432/241 |
| 5,989,330 A * | 11/1999 | Semler | C04B 28/24 106/286.1 |
| 6,528,011 B2 | 3/2003 | Connors, Sr. | |
| 6,773,770 B1 | 8/2004 | Sugiyama et al. | |
| 7,176,153 B2 | 2/2007 | Anderson | |
| 7,500,511 B2 | 7/2009 | Connors | |
| 7,562,694 B2 | 7/2009 | Connors, Jr. | |
| 8,128,996 B2 | 3/2012 | Davies et al. | |
| 8,505,335 B2 | 8/2013 | Connors, Sr. | |
| 8,505,336 B2 | 8/2013 | Connors, Jr. | |
| 9,334,196 B2 | 5/2016 | Connors, Jr. et al. | |
| 9,376,575 B2 | 6/2016 | Connors, Jr. et al. | |
| 9,512,042 B2 | 12/2016 | Connors, Jr. et al. | |
| 2002/0001604 A1 | 1/2002 | Shigera et al. | |
| 2004/0058166 A1 | 3/2004 | Nakamura | |
| 2004/0077768 A1 | 4/2004 | Greenwood | |
| 2005/0210615 A1 | 9/2005 | Shastry et al. | |
| 2005/0214720 A1 | 9/2005 | Milanovich et al. | |
| 2005/0276923 A1 | 12/2005 | Davies et al. | |
| 2007/0104816 A1 * | 5/2007 | Woodside | B28B 11/24 425/289 |
| 2007/0140986 A1 | 6/2007 | Prencipe et al. | |
| 2007/0269650 A1 | 11/2007 | Leuninger et al. | |
| 2007/0272382 A1 | 11/2007 | Becker et al. | |
| 2008/0116621 A1 * | 5/2008 | Brennan | F27B 9/10 264/606 |
| 2010/0247700 A1 * | 9/2010 | Hayashi | B22C 9/04 425/176 |
| 2012/0031300 A1 | 2/2012 | Olsen et al. | |
| 2012/0031306 A1 * | 2/2012 | Belden | B28B 5/025 106/705 |
| 2005/0294825 | 11/2012 | Ehara et al. | |

FOREIGN PATENT DOCUMENTS

| | | |
|---|---|---|
| EP | 1 186 637 A1 | 3/2002 |
| EP | 1 299 482 B1 | 8/2006 |
| EP | 2 565 173 A1 | 3/2013 |
| JP | H08 157266 A | 6/1996 |
| RU | 2 015 131 C1 | 6/1994 |
| WO | WO 2013/034158 A1 | 3/2013 |
| WO | WO 2014/018750 A1 | 1/2014 |

OTHER PUBLICATIONS

Co-pending U.S. Appl. No. 15/439,868, filed Feb. 22, 2017.
Co-pending U.S. Appl. No. 15/439,885, filed Feb. 22, 2017.
Advertisement, "Kiln Car Refractory Perth," Annexus WA, downloaded from Nov. 30, 2017 from http:/www.annexuswa.com/kiln-car.html.

* cited by examiner

REFRACTORY KILN CAR RESISTANT TO HIGH TEMPERATURE SHOCK AND CREEP

This application is a continuation-in-part of U.S. patent application Ser. No. 15/461,322, filed on Mar. 16, 2017, the disclosure of which is incorporated by reference.

FIELD OF THE INVENTION

This invention is directed to a refractory composition that is useful for making refractory articles, linings and parts that are resistant to high temperature shock and creep.

BACKGROUND OF THE INVENTION

Refractory compositions are used to manufacture, repair and/or coat a wide variety of articles that are used in the processing of molten steel, aluminum, copper, and other molten metals. The refractory article can be a refractory part, container or liner thereof. Examples include refractory bricks, pipes, plugs, troughs, runner, ladles, furnaces, ovens, subhearths, walls, ceilings, roofs, floors, ramps, launders, lentils, door jams and doors. The refractory compositions are described in a wide variety of patents and patent applications, including without limitation U.S. Pat. No. 5,505,893, issued to Connors, Jr; U.S. Pat. No. 5,494,267, issued to Anderson et al; U.S. Pat. No. 5,422,323, issued to Banerjee et al; and U.S. Pat. No. 5,147,830, issued to Banerjee et al.

Many of these applications involve exposure of the refractory to temperatures of 600° C. to 1800° C. At these high temperatures, the refractory articles must be able to withstand corrosion, shock and deformation.

Due to the extreme exposure conditions, refractory articles require periodic replacement or repair. This typically requires down time for the process that uses the refractory. There is a need or desire for a refractory composition that has improved resistance to shock and creep when used in high temperature processes.

SUMMARY OF THE INVENTION

The present invention is directed to a refractory composition and refractory articles made therefrom, that have excellent shock resistance and creep resistance at high temperatures. The refractory composition includes the following ingredients, based on the weight of the composition:
about 50% to about 90% by weight chamotte;
about 5% to about 25% by weight mullite;
about 3% to about 20% by weight fused silica; and
about 3% to about 30% by weight of an aqueous colloidal silica binder.

The present invention is also directed to a refractory composition and refractory articles made therefrom, wherein the refractory composition that includes chamotte and about 3% to about 30% by weight of an aqueous colloidal silica binder. The chamotte includes the following components, based on the weight of the chamotte:
about 35% to about 65% by weight of a first chamotte component having particle sizes ranging from 2380 to 6730 microns;
about 10% to about 35% by weight of a second chamotte component having particle sizes ranging from 841 to less than 2380 microns, and about 15% to about 45% by weight of a third chamotte component having particle sizes less than 841 microns.

The present invention is also directed to a method of making a refractory article that includes the following steps:
providing a refractory composition that includes, based on the weight of the composition, about 50% to about 90% by weight chamotte, about 5% to about 25% by weight mullite, about 3% to about 20% by weight fused silica, and about 3% to about 30% by weight of an aqueous colloidal silica binder;
forming the refractory composition into a refractory article; and
drying the refractory article.

The present invention is also directed to a method of making a refractory article that includes the following steps:
providing dry ingredients that include chamotte, the chamotte including about 35% to about 65% by weight of a first chamotte component having particle sizes ranging from 2380 to 6730 microns, about 10% to about 35% by weight of a second chamotte component having particle sizes ranging from 841 to less than 2380 microns and about 15% to about 45% by weight of a third chamotte component having particle sizes less than 841 microns;
adding an aqueous colloidal silica binder to the dry ingredients, and mixing the aqueous colloidal silica binder with the dry ingredients to form the refractory composition;
forming the refractory composition into a refractory article; and
drying the refractory article.

The refractory composition of the invention can be used to make a wide variety of refractory articles, including refractory parts, containers, and liners. Examples of refractory articles include without limitation refractory kiln cars, bricks, pipes, plugs, troughs, runners, ladles, furnaces, ovens, subhearths, walls, ceilings, roofs, floors, ramps, launders, lentils, door jams, and doors. The refractory articles thus formed have excellent high temperature shock resistance, creep resistance and hot load resistance compared to conventional refractories.

Refractory articles made from the refractory composition include the same components as the refractory composition except that the percentages are based on the dry weight of the composition, after the water has been removed by heating, drying, and/or other suitable techniques. The refractory article may include, based on dry weight, about 55% to about 95% by weight of the chamotte, about 10% to about 30% by weight of the mullite, about 5% to about 25% by weight of the fused silica, and about 2% to about 25% by weight of the colloidal silica particles having a mean particle diameter of about 1 to about 100 nanometers. The chamotte may suitably include first, second and third chamotte components, as described above.

DETAILED DESCRIPTION OF THE INVENTION

Figure 1:
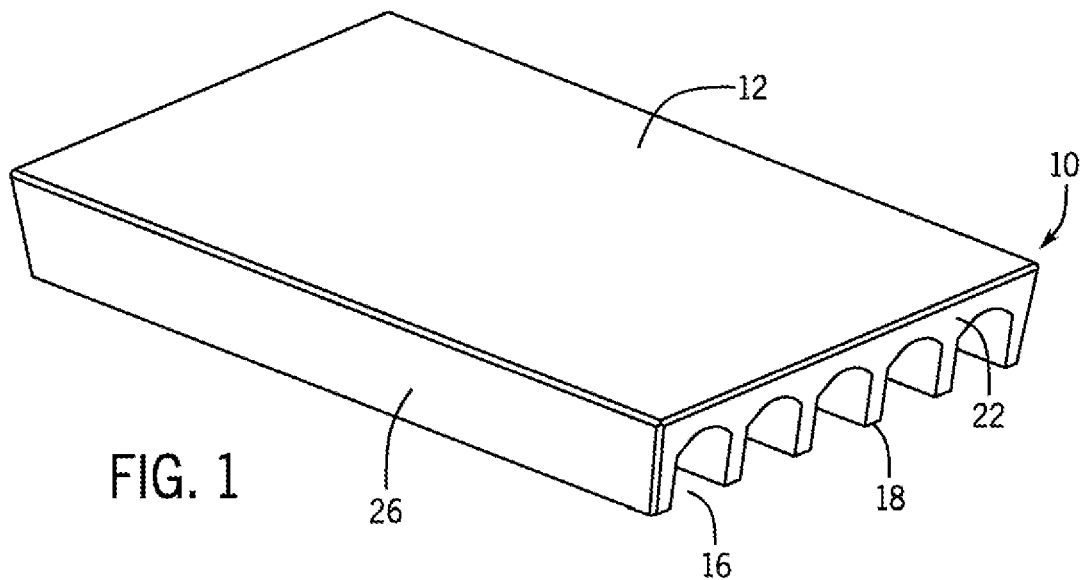
FIG. 1 is a perspective view of a refractory viaduct block used to assemble a kiln car.

In accordance with the invention, a refractory composition is provided that can be used to form refractory articles having excellent high-temperature shock resistance and creep resistance. The refractory composition primarily includes chamotte, suitably about 50% to about 90% by weight chamotte, or about 55% to about 85% by weight, or about 60% to about 70% by weight. Chamotte is defined herein as a cement-free alumina-silicate refractory composite that includes about 35% by weight to about 49% by weight alumina ($Al_2O_3$), about 51% to about 65% by weight silica ($SiO_2$), and zero to about 4% by weight iron, produced by firing selected clays having this composition to high temperatures of 900-1200° C., followed by grinding and screening to desired particle sizes. Suitably, the chamotte includes about 40% to about 45% by weight alumina, about 55% to about 60% by weight silica, and 0 to about 3% by weight iron.

In one embodiment of the invention, the chamotte includes first, second and third chamotte components having selected particle sizes. The first chamotte component has screen mesh particle sizes ranging from 2380 microns (8 mesh) to 6730 microns (3 mesh). The second chamotte component has screen mesh particle sizes ranging from 841 microns (20 mesh) to less than 2380 microns (8 mesh). The third chamotte component has screen mesh particle sizes less than 841 microns (8 mesh). The first, second and third chamotte components are prepared by grinding and screening using the appropriate mesh screen sizes, as explained above. The chamotte suitably includes about 35% to about 65% by weight of the first chamotte component, or about 40% to about 60% by weight, or about 45% to about 55% by weight, based on the weight of the chamotte. The chamotte suitably includes about 10% to about 35% by weight of the second chamotte component, or about 15% to about 30% by weight, or about 17% to about 25% by weight, based on the weight of the chamotte. The chamotte suitably includes about 15% to about 45% by weight of the third chamotte component, or about 20% to about 40% by weight, or about 25% to about 35% by weight, based on the weight of the chamotte.

In one embodiment of the invention, the refractory composition includes mullite, suitably in an amount of about 5% to about 25% by weight, or about 10% to about 20% by weight, based on the weight of the refractory composition. Mullite is a rare silicate mineral having either of two stoichiometric forms, namely $3Al_2O_3.2SiO_2$ or $2Al_2O_3.SiO_2$. Mullite is resistant to corrosion under high temperature conditions and helps to facilitate excellent corrosion resistance of the overall refractory composition. The mullite suitably has a median particle size of less than about 100 microns, or about 1 to about 50 microns and can suitably have particle sizes of less than about 44 microns (325 mesh).

By using micronized mullite having the small particle size, the mullite helps to stabilize the ingredients of the wet composition, helping them to remain uniformly suspended during casting. The mullite also helps to fill the pores of the dry refractory composition, thus reducing its porosity and improving its resistance to penetration by molten metals and vapors.

In one embodiment of the invention, the refractory composition includes fused silica particles, suitably in an amount of about 3% to about 20% by weight, or about 5% to about 15% by weight. Fused silica is an amorphous (non-crystalline) silica composed of a silicon dioxide having a highly crosslinked three dimensional molecular structure. The fused silica particles suitably have a median particle size of less than about 100 microns, or about 1 to about 50 microns, and can suitably have particles sizes less than about 44 microns (325 mesh). The fused silica also helps to fill the pores of the refractory composition, thus reducing its porosity and improving its resistance to penetration by molten metal and vapors.

In one embodiment, the refractory composition includes calcined alumina, suitably in an amount of about 0.5% to about 4% by weight, or about 1% to about 3% by weight. The calcined alumina may have a median particle size of about less than about 100 microns, or about 1 to about 50 microns, and can suitably have particle sizes less than about 44 microns (325 mesh). The calcined alumina also helps fill the pores of the refractory composition, thus reducing its porosity and improving its resistance to penetration by molten metals and vapors.

In one embodiment, the refractory composition includes microsilica, suitably in amounts of about 0.5% to about 4% by weight, or about 1% to about 3% by weight. The optional microsilica (which is exclusive of the colloidal silica binder described below) may have a median particle size of about 100 microns or less (e.g. about 0.1 to about 100 microns), or about 25 microns or less, or about 15 microns less, or about 5 microns or less. When used, the microsilica improves the initial flow characteristics of the refractory composition.

The refractory composition includes about 3% to about 30% by weight of an aqueous colloidal silica binder, suitably about 5% to about 25% by weight, or about 10% to about 20% by weight. The aqueous colloidal silica binder includes about 20% to about 70% by weight colloidal silica particles and about 30% to about 80% by weight water, suitably about 40% to about 60% by weight colloidal silica particles and about 40% to about 60% by weight water, based on the weight of the binder. The term "colloidal silica" refers to silica ($SiO_2$) particles having particle sizes that cause them to repel each other and remain uniformly suspended in the aqueous medium, prior to being combined with the other ingredients of the refractory composition. The colloidal silica particles should have a median particle size of about 1 to about 100 nanometers, or about 5 to about 90 nanometers, or about 10 to 80 nanometers, or about 12 to about 75 nanometers.

The refractory composition can be made by mixing the chamotte, mullite, fused silica, calcined alumina (if present) and microsilica (if present) together, to form a dry blend. The dry ingredients may be tumble blended or otherwise mixed together using any suitable technique. The wet component, namely, the aqueous colloidal silica binder, is then mixed with the dry components to form a damp mixture that can be pumped, poured or otherwise transported to a mold to form a refractory article.

The present invention is also directed to a refractory composition and refractory articles made from the composition, that include the same components, with percentages calculated based on the dry weight of the composition, after the water has been removed. The refractory composition and refractory articles include, based on dry weight, about 55% to about 95% by weight of the chamotte, about 10% to about 30% by weight of the mullite, about 5% to about 25% by weight of the fused silica, and about 2% to about 25% by weight of the colloidal silica particles having a mean particle diameter of about 1 to about 100 nanometers.

The refractory composition and refractory articles made from it may suitably include about 60% to about 90% by weight of the chamotte, or about 70% to about 80% by weight of the chamotte, based on the dry weight of the refractory composition. The chamotte may suitably include first, second and third chamotte components having the respective particle size ranges described above, and in the respective weight percentages described above, based on the weight of the chamotte.

The refractory composition and refractory articles made from it may suitably include about 15% to about 25% by weight of the mullite, based on the dry weight of the refractory composition. The mullite may be present in either or both stoichiometric forms, $3Al_2O_3.2SiO_2$ or $2Al_2O_3.SiO_2$, as described above, and may have the particle sizes described above. The refractory composition and refractory articles may suitably include about 10% to about 20% by weight of the fused silica, based on the dry weight of the refractory composition, and may have the particle sizes described above.

When present, the refractory composition and refractory articles made from it may include about 1% to about 5% by weight calcined alumina, suitably about 2% to about 4% by weight calcined alumina having the particle sizes and description stated above, based on the dry weight of the refractory composition. When present, the refractory composition and refractory articles made from it may include about 1% to about 5% by weight microsilica, suitably about 2% to about 4% by weight microsilica having the particle sizes and description stated above, based on the dry weight of the refractory composition.

The refractory composition and refractory articles made from it may suitably include about 2% to about 25% by weight of the colloidal silica particles, or about 3% to about 20% by weight, or about 5% to about 15% by weight, based on the dry weight of the refractory composition. The colloidal silica particles serve as a binder between the remaining ingredients of the refractory composition. The binding occurs as the initially damp refractory composition is dried to remove water. The colloidal silica particles may have the particle sizes described above.

The present invention is directed to a wide variety of refractory articles made from the refractory composition described above. In each case, the refractory article has the same composition as the refractory composition, based on the dry weight of the refractory composition, as described above. As explained above, the refractory article may include about 55% to about 95% by weight chamotte, about 10% to about 30% by weight mullite, about 5% to about 25% by weight fused silica, and about 2% to about 25% by weight colloidal silica particles.

Again, the chamotte may include about 35% to about 65% by weight of a first chamotte component, about 10% to about 35% by weight of a second chamotte component, and about 15% to about 45% by weight of a third chamotte component. The first chamotte component has screen mesh particle sizes ranging from 2380 to 6730 microns. The second chamotte component has screen mesh particle sizes ranging from 841 to less than 2380 microns. The third chamotte component has screen mesh particle sizes of less than 841 microns.

The present invention is also directed to a refractory composition that includes about 3% to about 30% by weight of an aqueous colloidal silica binder as described above and the tri-component chamotte described above, with the remaining ingredients being optional. After drying, the dried refractory composition and resulting refractory articles would thus contain about 2% to 25% by weight of the colloidal silica particles and the tri-component chamotte. The chamotte includes, based on the weight of the chamotte, about 35% to about 65% by weight of a first chamotte component having screen mesh particle sizes ranging from 2380 to 6730 microns, about 10% to about 35% by weight of a second chamotte component having screen mesh particle sizes ranging from 841 to less than 2380 microns, and about 15% to about 45% by weight of a third chamotte component having screen mesh particle sizes less than 841 microns. The refractory composition may also include about 5% to about 25% mullite having particle sizes less than 841 microns.

The refractory articles having the above-described refractory compositions include without limitation refractory parts, containers and liners. Examples of refractory articles include refractory kiln cars, bricks, pipes, plugs, troughs, runners, ladles, furnaces, ovens, subhearths, walls, ceilings, roofs, floors, ramps, launders, lentils, door jams and doors. The refractory articles have excellent high temperature thermal shock resistance, creep resistance and hot load resistance compared to conventional refractory parts.

Figure 2:
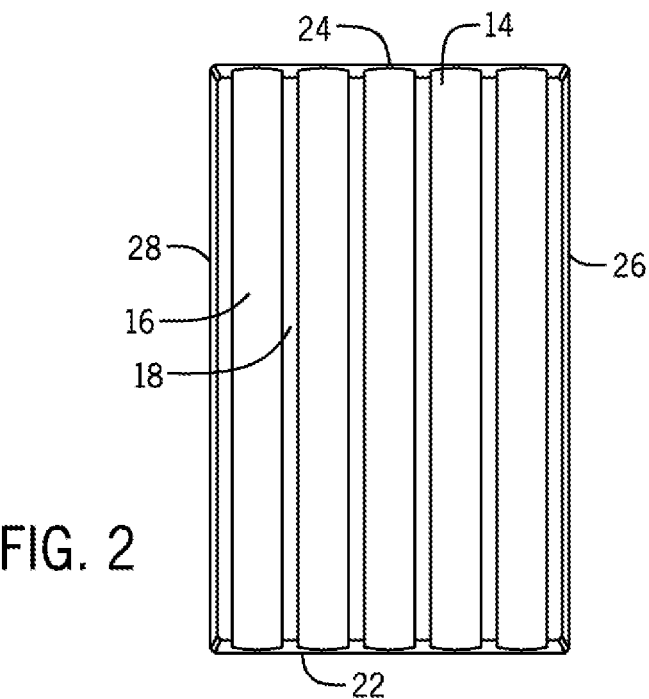
FIG. 2 is a bottom view of the refractory viaduct block shown in FIG. 1.
Figure 3:
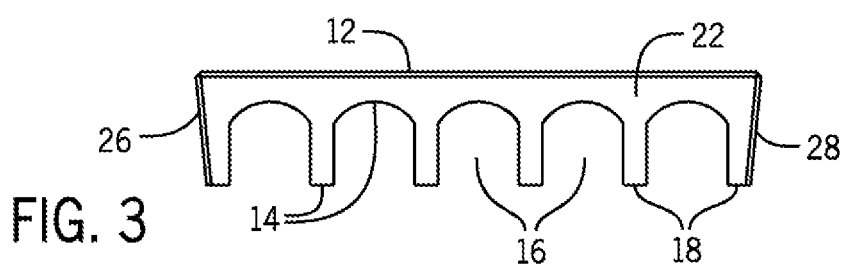
FIG. 3 is a front view of the refractory viaduct block shown in FIG. 1.

FIGS. 1-3 illustrate a refractory viaduct block formed from the refractory composition of the invention. The refractory viaduct block 10 includes a flat top surface 12 used for supporting and carrying heavy objects such as stacks of housing bricks, a bottom surface 14 defining a plurality of viaduct tunnels 16 separated by structural beams 18, front and back edges 22 and 24 further defining the structural beams and viaduct tunnels, and side surfaces 26 and 28. The refractory viaduct block 10 can be formed as a single-piece monolithic structure. The viaduct block 10 can be formed as a single-piece monolithic structure. The curved viaduct openings 16 can be used to facilitate heating and firing, and the structural beams 18 have a thickness and configuration that provides ample support for the load.

Figure 4:
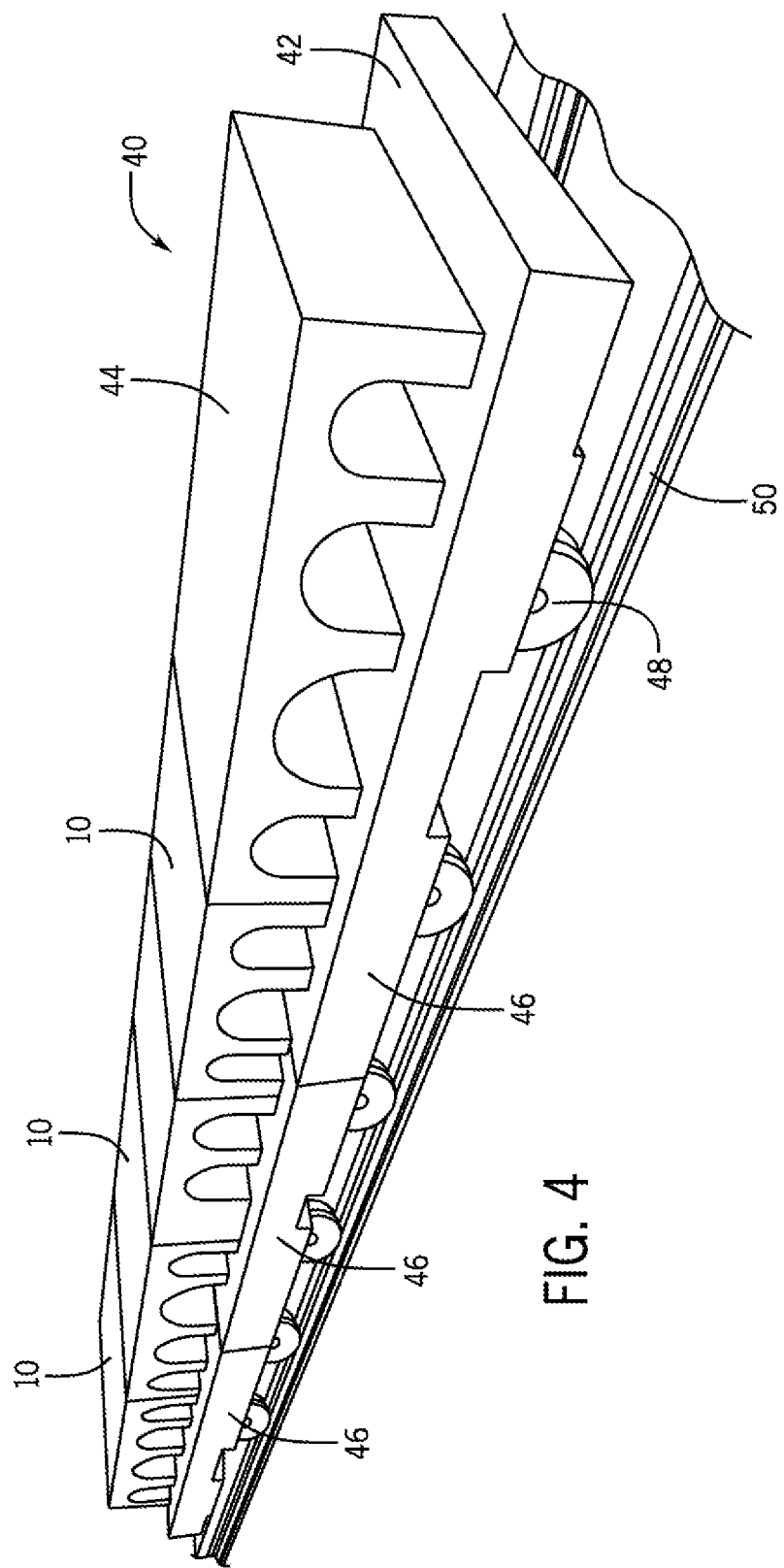
FIG. 4 is a perspective view of a kiln car formed by positioning a plurality of refractory viaduct blocks of FIG. 1 side-by-side.

Referring to FIG. 4, a kiln car 40 includes a base platform 42 supporting a viaduct block assembly 44. The base platform 42 includes a plurality of flat, rectangular refractory slabs 46 which are positioned end-to-end and can be formed from the refractory composition of the invention. The viaduct block assembly 44 is formed by positioning a plurality of refractory viaduct blocks 10 end-to-end, each one being formed using the refractory composition of the invention, and positioned on the base platform 42. The kiln car 40 is mounted with wheels 48 that travel along track 50.

During use, the refractory kiln car 40 supports a heavy load of items, such as housing bricks, that need to be fired. The kiln car carries the items into a batch or continuous tunnel kiln (not shown), where the load of items can be preheated to an elevated temperature (for example, 300° F. or 150° C.) for a period of time (for example, 6 hours), then heated at a second elevated temperature (for example, 200° F. or 1100° C.) for a period of time (for example, 12 hours), then cooled or permitted to cool to room temperature.

Figure 5:
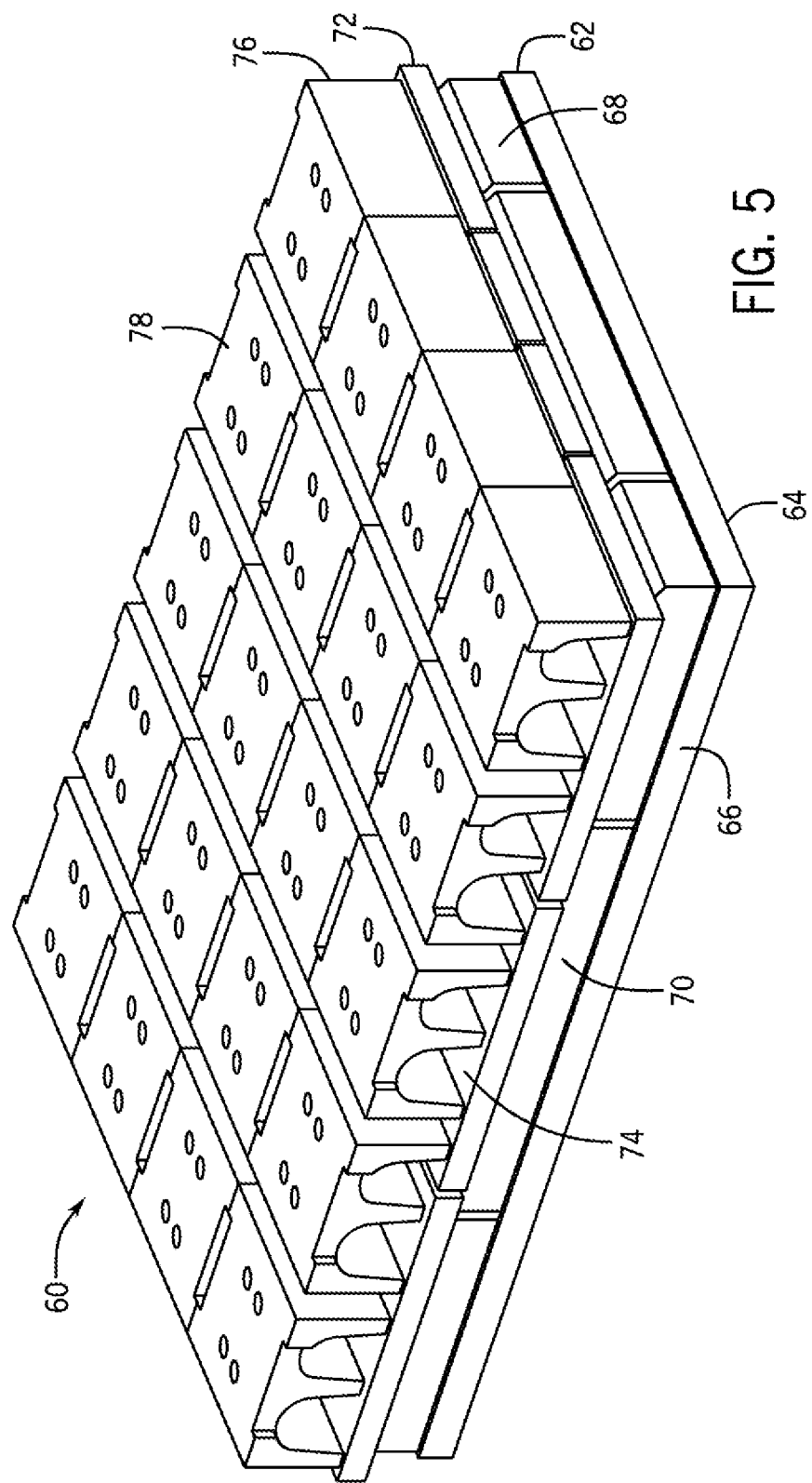
FIG. 5 is a perspective view of another embodiment of a kiln car formed by positioning a plurality of smaller refractory viaduct blocks side-by-side and end-to-end.

FIG. 5 shows an alternative embodiment of a kiln car 60 whose parts are made using the refractory composition of the invention. The kiln car 60 includes a base platform 62 having three layers 64, 68 and 72. Layer 64 includes a plurality of flat, rectangular refractory slabs 66 positioned end-to-end. Layer 68 includes a thicker plurality of flat, rectangular refractory slabs 70 which are positioned side-by-side and end-to-end due to their relatively smaller size. Layer 72 includes a plurality of flat, rectangular slabs 74 which are positioned side-by-side and end-to-end. In the embodiment shown, the layers 64 and 72 are both thinner than the layer 68. The thickness and number of base platform layers can vary depending on the needs of the specific application.

The kiln car 60 also includes a viaduct block assembly 76 positioned on and supported by the base platform 62. The viaduct assembly 76 is formed of a plurality of refractory viaduct blocks 78 which are smaller than the viaduct blocks 10 described above, and which are positioned both side-to-side and end-to-end as shown. The kiln car 60 is designed to carry a heavy load of bricks or other items through a continuous kiln tunnel, or in and out of a batch kiln tunnel, for firing. The monolithic viaduct structure of the viaduct blocks 78, as well as the viaduct blocks 10 described above, facilitates the carrying of heavy loads when formed using the refractory composition of the invention.

Figure 6:
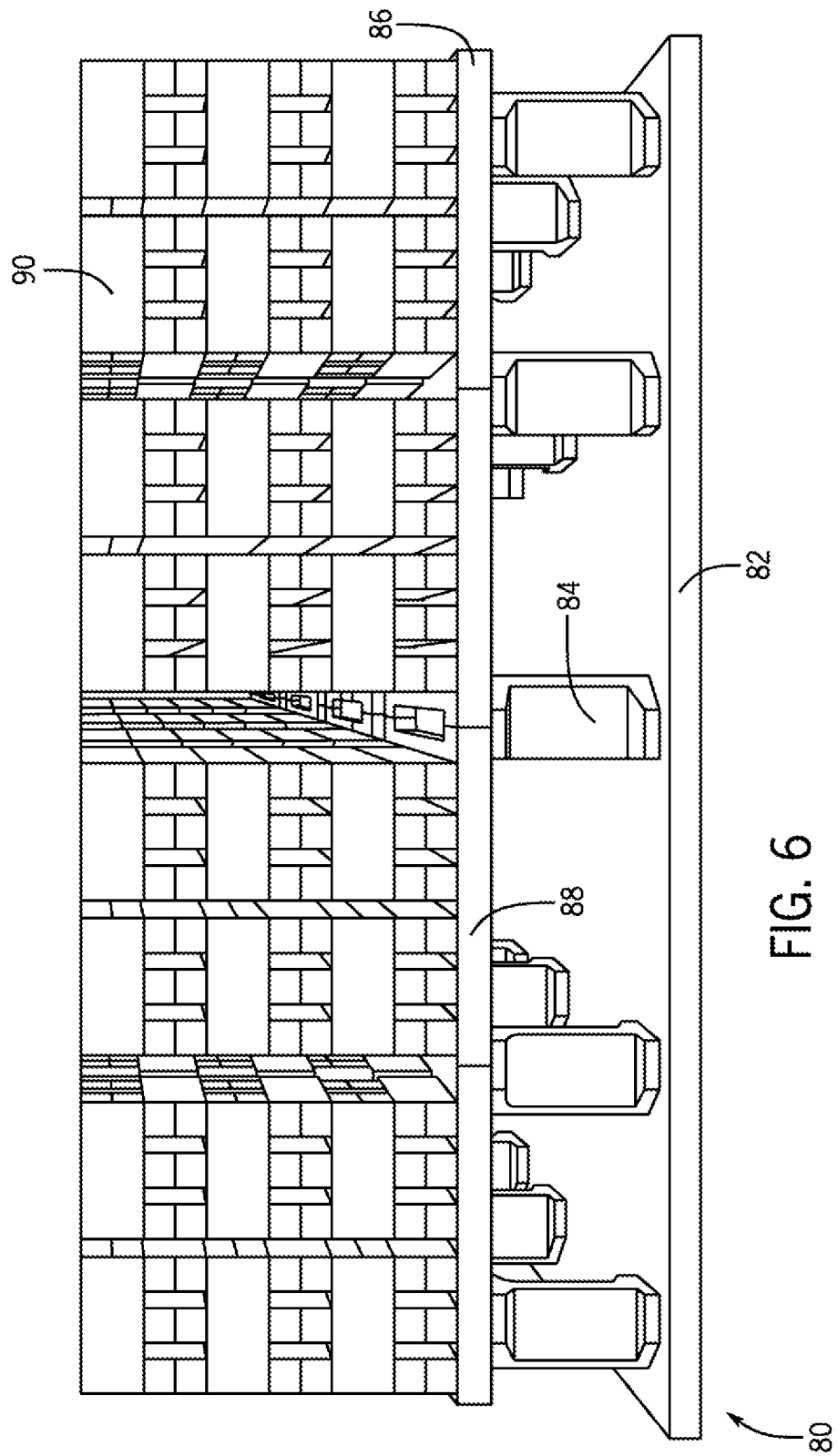
FIG. 6 is a side view of another embodiment of a refractory kiln car, which is loaded with bricks.
Figure 7:
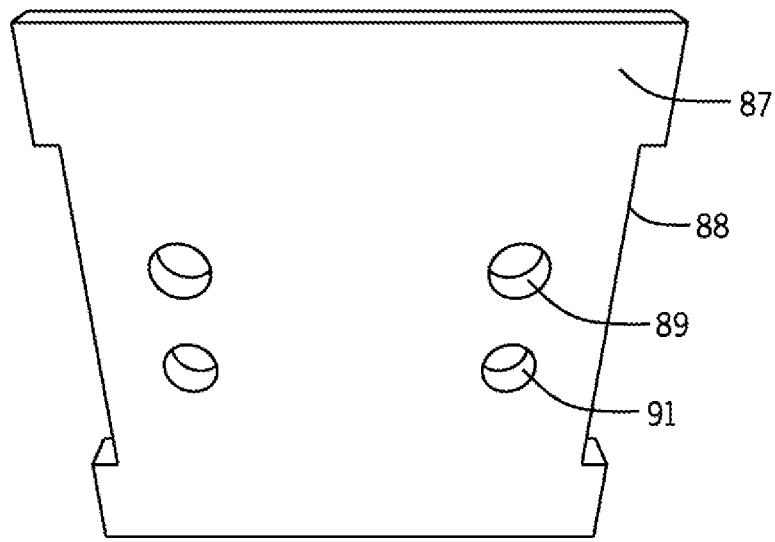
FIG. 7 is a perspective view of a plate used in the refractory kiln car of FIG. 7.

FIG. 6 shows an alternative embodiment of a kiln car 80 whose structure resembles kiln cars of the prior art, but which is formed using the refractory composition of the invention. The kiln car 80 includes a base platform 82; a plurality of support beams 84, which as shown, can be configured as I-beams positioned in predetermined spacing on the base platform 82; and a table 86 formed by positioning a plurality of flat slabs 88 end-to-end and side-by-side on the support beams 84. As shown in FIG. 7, the flat slabs 88 can be square or rectangular with thicker end portions 87 and vent openings 89 in the central region 91. A heavy load of bricks 90 is positioned on the table 86 and carried by the kiln car 80.

The base platform 82, support beams 84, and table 86 formed of flat slabs 88 can individually or collectively be formed using the refractory composition of the invention. As explained further below, the refractory composition of the invention has been found to significantly reduce or eliminate warping of the flat slabs 88 during use, and cracking and breaking of the flat slab 88 which previously occurred in the vicinity of the support beams 84. One advantage of the refractory composition of the invention is to enable the production of conventional refractory articles, such as kiln car 80, having improved thermal shock resistance, creep resistance, and hot load resistance compared to their counterparts formed using known materials. Another advantage of the refractory composition of the invention is that it can be used to produce new refractory articles, such as the kiln cars 40 and 60 described above, that show further improvements in these properties due to their shapes.

The present invention is also directed to a method of making a refractory article. The refractory article can be a refractory part, container or liner. Examples of refractory articles include without limitation refractory kiln cars, bricks, pipes, plugs, troughs, runners, ladles, furnaces, ovens, subhearths, walls, ceilings, roofs, floors, ramps, launders, lentils, door jams and doors. The refractory article can be made using any embodiment of the refractory compositions described above.

In one embodiment, the method includes the step of providing a refractory composition that includes, based on the weight of the composition, about 50% to about 90% by weight chamotte, about 5% to about 25% by weight mullite, about 3% to about 20% by weight fused silica, and about 3% to about 30% by weight of an aqueous colloidal silica binder, as described above. The method further includes the steps of forming the refractory composition into a refractory article, and drying the refractory article.

In one embodiment, the step of drying the refractory article includes the step of drying at room temperature for at least about 15 minutes, followed by baking at an elevated temperature of at least about 100° C. The baking can last anywhere from about 5 to about 30 hours, depending on the size and shape of the refractory article and its specific composition.

The chamotte can include the tri-component chamotte described above, and can be present in any amount described above. In one embodiment, the forming step includes the step of casting the refractory composition into a mold. The casting can be performed using any suitable technique, including pouring or pumping the refractory composition into the mold.

In one embodiment, the step of providing the refractory composition can be performed in two or more steps. For example, the dry components can be provided in a first step and the aqueous colloidal silica binder can be provided in a second step. In the first step, dry refractory ingredients can be combined that include, based on the weight of the refractory composition, about 50% to about 90% by weight chamotte, about 5% to about 25% by weight mullite, about 3% to about 20% by weight fused silica, and any other dry components. An aqueous colloidal silica binder (as described above) is then added and mixed with the dry component to form the refractory composition. The refractory composition may include about 3% to about 30% by weight of the aqueous colloidal silica binder. The refractory composition can then be cast into a mold or other forming device by pumping using a concrete pump, or by pouring or other known techniques.

The above refractory composition is then molded or otherwise formed into a refractory article, which can be dried and baked as described above. Drying can occur at room temperature for 15 minutes or longer, causing initial hardening and setting of the refractory article. Baking can occur at 100° C. or higher, for 5 to 30 hours, or a time sufficient to cause further hardening and setting of the refractory article.

In one embodiment, the method of making a refractory article includes a first step of providing dry ingredients that include chamotte. The chamotte includes about 35% to about 65% by weight of a first chamotte component having screen mesh particle sizes ranging from 2380 to 6730 microns, about 10% to about 35% by weight of a second chamotte component having screen mesh particle sizes ranging from 841 to less than 2380 microns, and about 15% to about 45% by weight of a third chamotte component having screen mesh particle sizes less than 841 microns. In this embodiment, other dry ingredients are optional. In a second step, an aqueous colloidal silica binder (as described above) is added to the dry ingredients, and mixed with the dry ingredients to form a refractory composition. The resulting refractory composition suitably includes about 3% to about 30% by weight of the aqueous colloidal silica binder. The refractory composition can then be cast into a forming device to form a refractory part, which can be dried and baked as described above.

Other dry ingredients may be included in this embodiment of the refractory composition. These other ingredients include mullite, suitably present at about 5% to about 25% by weight of the refractory composition; fused silica, suitably present at about 3% to about 20% by weight of the refractory composition; calcined alumina, suitably present at about 0.5% to about 4% by weight of the refractory composition; and microsilica, suitably present at about 0.5% to about 4% by weight of the refractory composition. These ingredients may have the descriptions and particle sizes explained above.

Examples

A refractory composition was prepared having the following ingredients in the following amounts.

| Ingredient | Supplier | Particle Size | % By Weight of Dry Components | % By Weight of Refractory Composition |
|---|---|---|---|---|
| Chamotte (Mulcoa 43) | C.E. Minerals, Inc. | 3-8 mesh | 34.2 | 30.3 |
| Chamotte (Mulcoa 43) | C.E. Minerals, Inc. | 8-20 mesh | 14.8 | 13.1 |
| Chamotte (Mulcoa 43) | C.E. Minerals, Inc. | 20 mesh | 19.8 | 17.5 |
| Mullite (Mulcoa 47) | C.E. Minerals, Inc. | 325 mesh | 15.0 | 13.3 |
| Fused Silica (D.C. Silica Fines) | Precisions Electro-Minerals Co. | 325 mesh | 11.6 | 10.3 |
| Calcined Alumina (AC-2) | Aluchem, Inc. | 325 mesh | 2.0 | 1.8 |
| Microsilica (955) | Elkem | <1 micron | 2.5 | 2.2 |
| Magnesium Oxide (Setting Agent) | | | 0.1 | 0.1 |
| Subtotal | | | 100 | 88.5 |
| Colloidal Silica Binder (Metset 2032-S, 40% solids) | | | 13.0 | 11.5 |
| TOTAL | | | | 100 |

Figure 8:
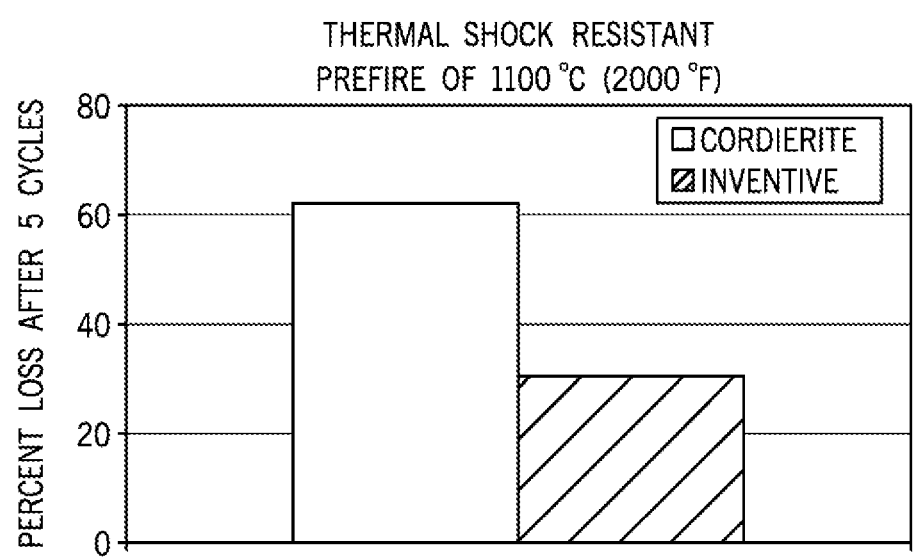
FIG. 8 shows the results of a thermal shock resistance test performed on refractory plates according to FIG. 7, using ASTM C-1171 and comparing the inventive composition to a cordierite composition of the prior art.

The inventive composition was tested against a conventional cordierite kiln furnace composition as follows. Thermal shock was tested using ASTM C-1171. The results are shown in FIG. 8. When cycled at 1100° C., refractory plates made using the inventive composition (pre-fired at 1100° C.) were found to lose only 27% of their bend strength. By comparison, prior art cordierite plates were found to lose 62% of their bend strength under the same test conditions. Creep was tested using ASTM C-832, at 1316° C. using a 25 psi load. Under these conditions, the inventive composition exhibited a very low creep rate of −0.005% per hour.

The embodiments of the invention described herein are presently preferred. Various modifications and improvements can be made without departing from the spirit and scope of the invention. The scope of the invention is indicated by the appended claims. All changes that fall within the meaning and range of equivalents are intended to be embraced therein.

We claim:

1. A refractory kiln car comprising a refractory composition that includes, based on the dry weight of the refractory composition:
   about 55% to about 95% by weight chamotte;
   about 10% to about 30% by weight mullite;
   about 5% to about 25% by weight fused silica; and
   about 2% to about 25% by weight colloidal silica particles having a mean particle diameter of about 1 to about 100 nanometers;
   wherein the kiln car comprises a plurality of spaced apart support beams and a table that includes a plurality of flat slabs positioned side-by-side and end-to-end on the support beams, wherein the support beams and flat slabs are formed from the refractory composition.

2. The refractory kiln car of claim 1, wherein the chamotte comprises, based on the weight of the chamotte:
   about 35% to about 65% by weight of a first chamotte component having screen mesh particle sizes ranging from 2380 to 6730 microns;
   about 10% to about 35% by weight of a second chamotte component having screen mesh particles sizes ranging from 841 to less than 2380 microns; and
   about 15% to about 45% by weight of a third chamotte component having screen mesh particle sizes less than 841 microns.

3. A refractory kiln car comprising a refractory composition that includes, based on the dry weight of the refractory composition:
   about 55% to about 95% by weight chamotte;
   about 10% to about 30% by weight mullite;
   about 5% to about 25% by weight fused silica; and
   about 2% to about 25% by weight colloidal silica particles having a mean particle diameter of about 1 to about 100 nanometers;
   wherein the kiln car comprises at least one viaduct block formed from the refractory composition and a base platform, the viaduct block including a flat top surface, a bottom surface defining a plurality of beams and viaduct tunnels between the beams, front and back edges further defining the beams and viaduct tunnels between the beams, and side surfaces, the base platform including a plurality of flat, rectangular refractory slabs formed from the refractory composition.

4. The refractory kiln car of claim 3, comprising a plurality of the viaduct blocks positioned end-to-end.

5. The refractory kiln car of claim 3, comprising a plurality of the viaduct blocks positioned both side-to-side and end-to-end.

6. The refractory kiln car of claim 3, wherein the viaduct block is formed as a monolithic structure.

7. The refractory kiln car of claim 1, wherein the kiln car further comprises a base platform that is formed using the refractory composition.

8. A refractory kiln car comprising a refractory composition that includes chamotte and about 2% to about 25% by weight colloidal silica particles, wherein the chamotte comprises, based on the weight of the chamotte:
- about 35% to about 65% by weight of a first chamotte component having screen mesh particle sizes ranging from 2380 to 6730 microns;
- about 10% to about 35% by weight of a second chamotte component having screen mesh particle sizes ranging from 841 to less than 2380 microns; and
- about 15% to about 45% by weight of a third chamotte component having screen mesh particle sizes less than 841 microns.

9. The refractory kiln car of claim 8, wherein the kiln car comprises at least one viaduct block formed from the refractory composition, the viaduct block including a flat top surface, a bottom surface defining a plurality of beams and viaduct tunnels between the beams, front and back edges further defining the beams and viaduct tunnels between the beams, and side surfaces.

10. The refractory kiln car of claim 9, comprising a plurality of the viaduct blocks positioned end-to-end.

11. The refractory kiln car of claim 9, comprising a plurality of the viaduct blocks positioned both side-to-side and end-to-end.

12. The refractory kiln car of claim 9, wherein the viaduct block is formed as a monolithic structure.

13. The refractory kiln car of claim 9, wherein the kiln car further comprises a base platform, the base platform including a plurality of flat, rectangular refractory slabs formed from the refractory composition.

14. The refractory kiln car of claim 8, wherein the kiln car comprises a plurality of spaced apart support beams and a table that includes a plurality of flat slabs positioned side-by-side and end-to-end on the support beams, wherein the support beams and flat slabs are formed from the refractory composition.

15. The refractory kiln car of claim 14, wherein the kiln car further comprises a base platform that is formed using the refractory composition.

16. A refractory kiln car, comprising a plurality of viaduct blocks and a base platform, the viaduct blocks being positioned side-by-side and/or end-to end on the base platform and formed of a refractory composition that includes, based on dry weight:
- about 55% to about 95% by weight chamotte;
- about 10% to about 30% by weight mullite,
- about 5% to about 25% by weight fused silica; and
- about 2% to about 25% by weight colloidal silica particles having a mean particle diameter of about 1 to about 100 nanometers;
- wherein the base platform is also formed of the refractory composition.

17. A refractory kiln car, comprising a plurality of viaduct blocks and a base platform, the viaduct blocks being positioned side-by-side and/or end-to end on the base platform and formed of a refractory composition that includes, based on dry weight:
- about 55% to about 95% by weight chamotte;
- about 10% to about 30% by weight mullite,
- about 5% to about 25% by weight fused silica; and
- about 2% to about 25% by weight colloidal silica particles having a mean particle diameter of about 1 to about 100 nanometers;
- wherein the refractory composition further comprises microsilica.

18. A refractory kiln car, comprising a plurality of viaduct blocks and a base platform, the viaduct blocks being positioned side-by-side and/or end-to end on the base platform and formed of a refractory composition that includes, based on dry weight:
- about 55% to about 95% by weight chamotte;
- about 10% to about 30% by weight mullite,
- about 5% to about 25% by weight fused silica; and
- about 2% to about 25% by weight colloidal silica particles having a mean particle diameter of about 1 to about 100 nanometers;
- wherein the refractory composition further comprises calcined alumina.

\* \* \* \* \*